F. LAMBERT.
CURRENT FLUID METER.
APPLICATION FILED MAR. 1, 1912.

1,253,502.

Patented Jan. 15, 1918.
4 SHEETS—SHEET 4.

Fig. 11.

Witnesses:

Inventor
Frank Lambert
By his Attorneys

UNITED STATES PATENT OFFICE.

FRANK LAMBERT, OF BROOKLYN, NEW YORK, ASSIGNOR TO THOMSON METER COMPANY, OF BROOKLYN, NEW YORK, A CORPORATION OF NEW JERSEY.

CURRENT FLUID-METER.

1,253,502.  Specification of Letters Patent.  Patented Jan. 15, 1918.

Application filed March 1, 1912. Serial No. 680,837.

*To all whom it may concern:*

Be it known that I, FRANK LAMBERT, a citizen of the United States, and a resident of Brooklyn, in the county of Kings and State of New York, have invented certain new and useful Improvements in Current Fluid-Meters, of which the following is a specification.

My invention relates, generally, to current fluid meters, more especially, water meters. One of the main objections to current meters as heretofore constructed is their lack of accuracy especially at small flows. Another objection is, that, their rotors being usually made of vulcanite or other light material, subject to injury by heat, (the rotors being customarily made of such material so that they may be as light as possible, and so may be, as nearly as possible, in a condition of flotation in the fluid passing through the meter), the meter cannot be used to measure hot fluids.

One feature of my invention resides in a meter rotor of novel construction, composed of such material, and so constructed, as not to be affected injuriously by such temperatures as are experienced in the metering of ordinary hot fluids, but which nevertheless is arranged to be floated or held in suspension by the fluid while the latter is flowing through the meter. Another feature of my invention resides in a substitute for the ordinary stuffing box through which passes the shaft driving the registering mechanism, whereby the wear on the parts of the internal reducing gear mechanism and resistance opposing free motion of the rotor occasioned by friction due to passage of such shaft through a stuffing box is reduced to a minimum. Another feature of my invention resides in means to increase the sensitiveness of the meter at low flows, by providing, outside of the main rotor, a speeder or secondary rotor to drive the registering mechanism at flows otherwise too small to actuate the main rotor or to give it the necessary speed for true registration. Other features of my invention are: Means to prevent running of the meter after the flow has been shut off; and means whereby the rotor is relieved of unnecessary friction and strain, particularly friction and strain due to end thrust, so detrimental when accurate registration at small flows is desired.

I will now proceed to describe my invention with reference to the accompanying drawings, in which one form of meter embodying my invention is illustrated, and will then point out the novel features in claims. In said drawings:

In the drawings, 1 designates the main or pressure casing of the flow-chamber of the meter, said casing being provided with an inlet 2 and with an outlet 3. 4 designates a rotor chamber located within casing 1, and 5 designates the rotor. The casing 1 is faced and bored in line to receive both the rotor chamber and the bridge 6 carrying the speed-reducing gearing hereafter mentioned. A dome 7 secured to the upper end of the casing 1 incloses the internal parts of the meter. The casing 1 is provided with the customary transverse partition 8, dividing the inlet from the outlet, and in this partition there is a large central aperture in which is freely fitted the lower portion of the rotor chamber 4, which chamber is secured to said partition 8 by means of three screws 9 passing freely through lugs 10 of the rotor chamber and threaded into the partition 8. The lower portion of the rotor chamber is of spider construction, the openings 11 of which permit free flow of fluid from entrance passage 2 into the rotor. The spindle 12 is centralized and supported by said spider, and is held in place by means of a nut 13.

The rotor comprises a central hub 14, bored through the greater portion of its length to permit said hub to fit freely upon stationary spindle 12; an outer shell 15, and helicoidal vanes 16 secured to the hollow hub 14 and to the shell 15 by fitting them within helicoidal grooves provided in the outer surface of the hollow hub 14, and in the inner surface of the shell 15. Particular preferred constructions of the rotor and vanes 16 will be described hereinafter. These vanes divide the flow space between hub 14 and shell 15 into a plurality of helicoidal passages. Fluid flowing through these passages of course tends to rotate the rotor. At its base, the hollow hub 14 of the rotor is provided with a hollow bell-shaped foot 17, below which is a circular valve disk 17$^a$, freely mounted on spindle 12, which, when the rotor is in its lowermost position, covers and closes the admission ports 11 between the arms of the spider of the rotor chamber 4. Water or other fluids passing through the meter will necessarily force this disk 17$^a$ upward, more or less, according to the rate of flow, so lifting the entire rotor; and the fluid, flowing around the edges of the disk 17$^a$ will enter the various passages of the rotor and will impart rotation to said rotor; the lift of the rotor thus produced being substantially proportional to the rate of flow, until the maximum lift is attained. At such maximum lift the passages through the meter will be maximum, and will substantially equal in area the area of cross section of the pipe for which the meter has been designed. When the flow through the meter is cut off, the rotor drops, under the influence of gravity, and the friction between the beveled periphery of disk 17$^a$ and its seat, and between the upper face of said disk and the face of the foot 17, bring the rotor quickly to rest and thus prevent racing or idle rotation of the rotor and registering mechanism after the flow ceases.

A shoulder 39 on spindle 14 limits the upward movement of the disk 17$^a$. The rotor 5, however, may lift slightly even after the disk 17$^a$ has been stopped by the shoulder 39 (there being ports 41 in disk 17$^a$ to admit fluid to the interior of hollow foot 17). Therefore, even when the disk 17$^a$ is against shoulder 39, the rotor itself is free from friction due to end thrust, since said rotor is free to revolve with respect to disk 17$^a$, and at such times there will always be a fluid film between foot 17 and disk 17$^a$.

Figure 11:
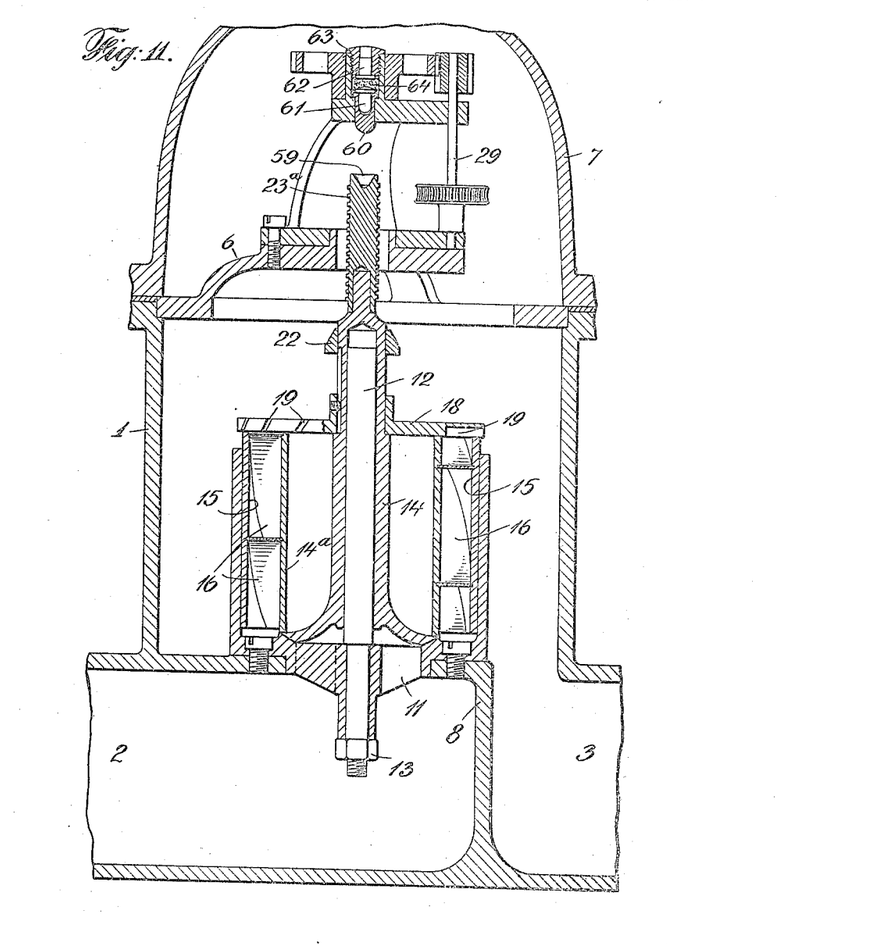
Fig. 11 shows a central vertical section of a meter the construction of which is in some respects different from the constructions heretofore illustrated and described.

While the construction just described is the one I prefer, it will be obvious that, as shown in Fig. 11, the disk 17$^a$ and shoulder 39 may be dispensed with, and the hollow foot 17 of the rotor formed to close ports 11 when said foot is in the down position. In this case, to withstand the end thrust, the upper end of hollow shaft 14 is provided with a bearing socket 59, which, when the rotor is fully lifted, will come into contact with a bearing point 60, carried by a fixed portion of the meter structure, but free to rotate and to lift, and itself carrying a separately formed hardened bearing pin 61 adapted to engage another hardened pin 62 carried by a screw 63; the space between 60 and 63 being filled with lubricant 64.

In either of the constructions thus described, the rotor is in full fluid suspension during the operation of the meter.

Figure 1:
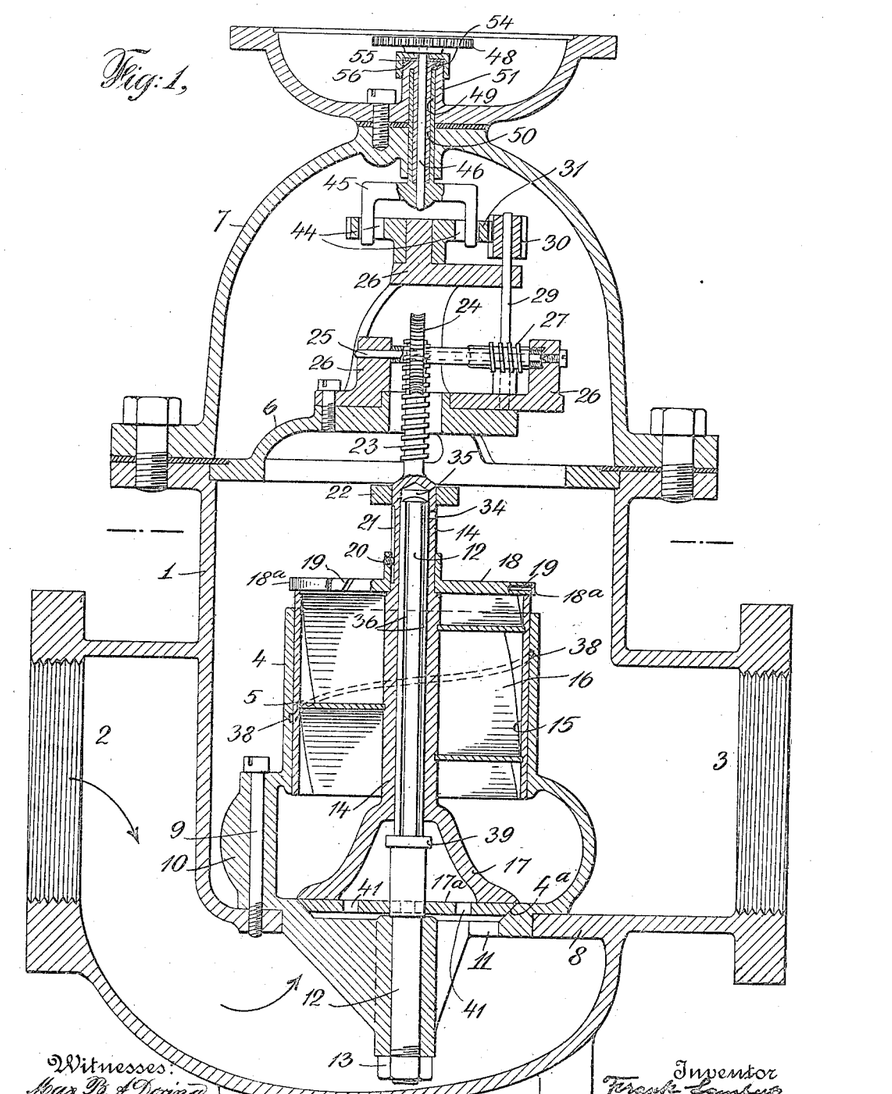
Figure 1 shows a central vertical section of the meter, the registering mechanism (except the first driving member thereof) being omitted.

In order, however, to insure that the rotor shall start in rotation as soon as flow begins through the meter, even though such flow be very slight, I provide the rotor with a secondary rotor or "speeder", 18, which is particularly effective to start operation of the registering mechanism when flow first begins and when such flow is extremely small, such secondary rotor or speeder comprising, in the construction shown, a disk 18 provided with oblique ports or nozzles 19 so directed that the fluid issuing through them tends to cause said disk 18 to rotate in the direction in which the rotor 5 normally rotates. This disk 18 in its lowermost position, as shown in Fig. 1, (which is the position occupied by the disk when the flow through the meter is small), stops the flow of fluid through the rotor except for the fluid which may flow through the oblique ports 19 mentioned.

When such flow through the rotor 5 exceeds a certain amount, depending upon the size and number of these ports 19, the entire disk 18 starts to lift, said disk being mounted to slide upon the hub of the rotor, and being provided with a key 20 working in a key slot 21 of the hub of the rotor, whereby rotation of the disk 18 with respect to the rotor is prevented. The disk 18 serves, when seated on the rotor, to prevent flow from the passages of the rotor except those passages with which the ports 19 communicate, thereby making the flow through those rotor passages with which the ports 19 communicate, correspondingly greater at such small flows, whereby the rotor is caused to have at such small flows, a higher rotative speed than it would otherwise have, thereby compensating for slip of the rotor at such low rates of flow. The plate 18 therefore constitutes an obstructor obstructing the flow of fluid through certain passages of the rotor at low rates of flow, as described in my application filed March 15, 1911, Sr. No. 614,614. Furthermore, since the ports 19 are oblique and incline in the same direction as the flow passages of the rotor, the fluid passing through said ports 19 at such greater speed tends to cause rotation of the speeder 18, hence of the rotor, by the intermediation of key 20 engaging slot 21. To demonstrate the action of the speeder 18 with ports 19, the following experiment can be made: Remove the driving key 20 so as to leave the speeder free to revolve independently of the rotor. It will be found that at low flows, at flows which are too small to actuate the rotor itself, the speeder will rotate freely, and if the key 20 is put back in position, it will be found that not only the speeder, but also the rotor, will rotate with it at a flow found before to be too small to rotate the rotor alone; in other words, at small flows the speeder drives the rotor; at large flows, the rotor becomes the driver and carries with it the speeder.

By varying the size and number or angle of ports 19, or the weight of the speeder 18, the speed of the rotor for low flows can be adjusted so as to have the low flow registration of the water delivered through the meter as correct as the registration at middle and large flows.

After the slots 19 in the speeder plate 18 have been milled, a ring 18ª can be forced on the disk to close the ports 19 at their outer edge, but this ring 18ª is not essential and can be dispensed with, as shown in Fig. 11.

In another application filed March 15, 1911, Serial No. 614,614 I have claimed an obstructor for obstructing the passage area of the fluid through the rotor at low rates of flow and therefore I do not claim such invention broadly in this case. However, it will be seen that the structure of the obstructors shown in such prior application is different, that those obstructors cannot, by action of the flow, take alone a movement of rotation, but are only intended to restrict the fluid passage through the rotor, while in this present case the obstructor 18 acts not only as an obstructor, but also as a speeder or secondary rotor to start or force the rotation of the main rotor at flows otherwise too small to start the rotor alone.

A collar 22 on the shaft 14 of the rotor limits the upward motion of the obstructor 18.

The upper portion of the shaft 14 is provided with a worm screw 23 intermeshing with a worm wheel 24, on a shaft 25 mounted in bearings in a bracket 26 secured to the bridge 6. This worm 23 is made long, in order that it may remain continuously in mesh with worm wheel 24 notwithstanding lifting of shaft 14. Shaft 25 carries a worm 27 intermeshing with a worm wheel 28 mounted on a vertical shaft 29 having bearings in the bracket 26, and this shaft 29 carries a pinion 30 meshing with a gear 30 mounted on a spindle formed on this bracket 26, the gears 23, 24, 27, 28, 30 and 31 constituting reducing gearing. It will be noted that the axis of gear 31 is in line with the axis of spindle 12.

Figures 2, 3, 4, 5:
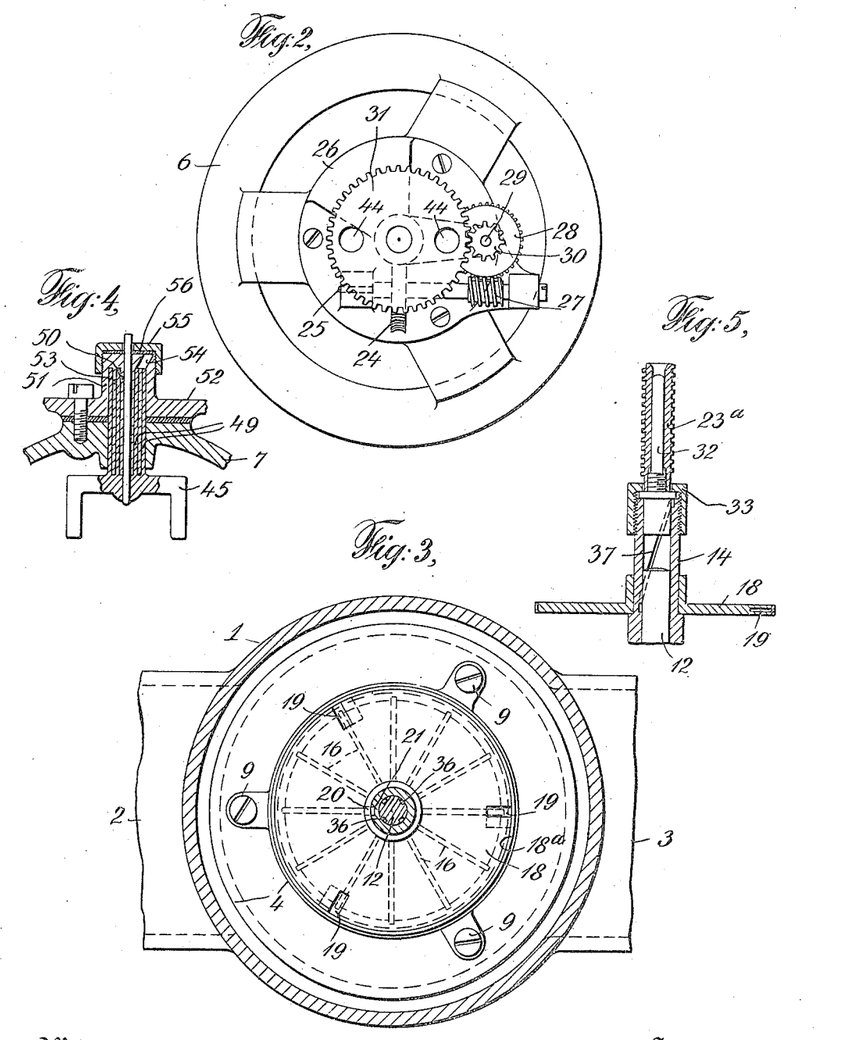
Fig. 2 shows a top view of the speed-reducing gear train.
Fig. 3 shows a transverse horizontal section of the meter taken just above the top of the rotor.
Fig. 4 shows a detail vertical section of an alternative stuffing-box construction.
Fig. 5 shows a detail vertical section of an alternative construction of the upper portion of the rotor shaft, comprising a movable worm-screw carried by said shaft.

In the construction shown in Fig. 1 the worm 23 is formed on shaft 14 itself. In the alternative construction shown in Fig. 5 the worm, here designated by numeral 23ª, is a piece separate from shaft 14, removably secured to shaft 14 by means of a headed extension pin 32 screw-connected to the hollow worm 23ª, the head of this pin 32 being held to shaft 14 by a clamping nut 33. In this construction the lower end of the nut 33 performs the function of the stop shoulder 22 of Fig. 1.

As shown particularly in Fig. 1, the hollow shaft 14 is provided with a small hole 34 which constitutes a port permitting controlled entrance or exit of fluid to or from the space 35 within shaft 14 above the top of spindle 12, thereby avoiding too great retardation of up and down motion of the rotor due to presence of fluid in this space.

Grooves 36 and 38 may be provided in the inner face of rotor chamber 4 and in spindle 12 to provide water lubrication, and water packing to prevent leakage between the rotor and rotor chamber, and thereby makes it unnecessary to fit said rotor too closely within its sleeve. These grooves 38 may be either circular or helical.

While obviously the rotor chamber 4 might be cast in one piece with the casing 1, I prefer to make said rotor chamber a separate member, especially to prevent deformation of the meter casing affecting the rotor chamber. It not infrequently happens that the meter casing is deformed by stress placed upon it due to connecting it to large pipes; and when the rotor chamber is a member separate from the casing 1, such slight deformation of the main casing does not cause corresponding deformation of the rotor chamber, if freely fitted in the casing, and so does not give rise to clamping of the rotor such as might prevent the rotor from revolving freely.

The upper or last gear, 31, of the internal gear-train of the meter, is provided with openings 44 into which fit the arms of a yoke 45 mounted upon a vertical spindle 46 passing through a suitable stuffing box in the top of the dome 7, and carrying at its upper end a gear 48, which gear is the driving gear of the meter registering mechanism, not here shown. I have found that, when sensitiveness is desired, as in a meter such as described, it is important to reduce to a minimum the friction of the shaft driving the registering mechanism, in its packing box. Ordinary stuffing boxes containing compressible packing material are either prone to leak, or, if set up tight enough to prevent leakage, interpose far too much frictional resistance to the rotation of the rotor. These objections are obviated in the construction herein described, wherein, instead of employing compressible packing material, I employ a labyrinthine construction, comprising one or more tubular spindles located between two or more fixed concentric sleeves. In the construction shown in Fig. 1, the yoke 45 is provided with a hollow spindle 49 located between concentric sleeves, 50 and 51, with which the register cup 52 is provided. In the construction shown in Fig. 4 the yoke 45 is provided with two concentric spindles 49, and the register cup 52 is provided with three concentric sleeves 50, 51 and 53. Obviously there may be few or many of these concentric spindles and sleeves, according to the number of convolutions desired in the labyrinthine leakage preventing device. In practice a clearance of only one or two thousandths of an inch is provided between adjacent surfaces of the labyrinthine leakage-preventing device, and in assembling the parts, a mixture of lubricant and plumbago is introduced between the surfaces. I have found that no other packing is required to prevent leakage, and that, when the antileakage-device described is used the parts move very freely and there is no leakage. I customarily provide an oil hole 54, through which lubricant may be introduced from time to time, and this oil hole may be covered by a screw cap 55, having within it a soft washer 56, there being ample clearance between such washer and the screw cap 55, and the spindle 46. With this construction, the labyrinthine antileakage device described, may be lubricated from time to time by removing the cap 55 and washer 56, while leakage around the spindle 46 is absolutely prevented.

Figures 6, 7, 8, 9, 10:
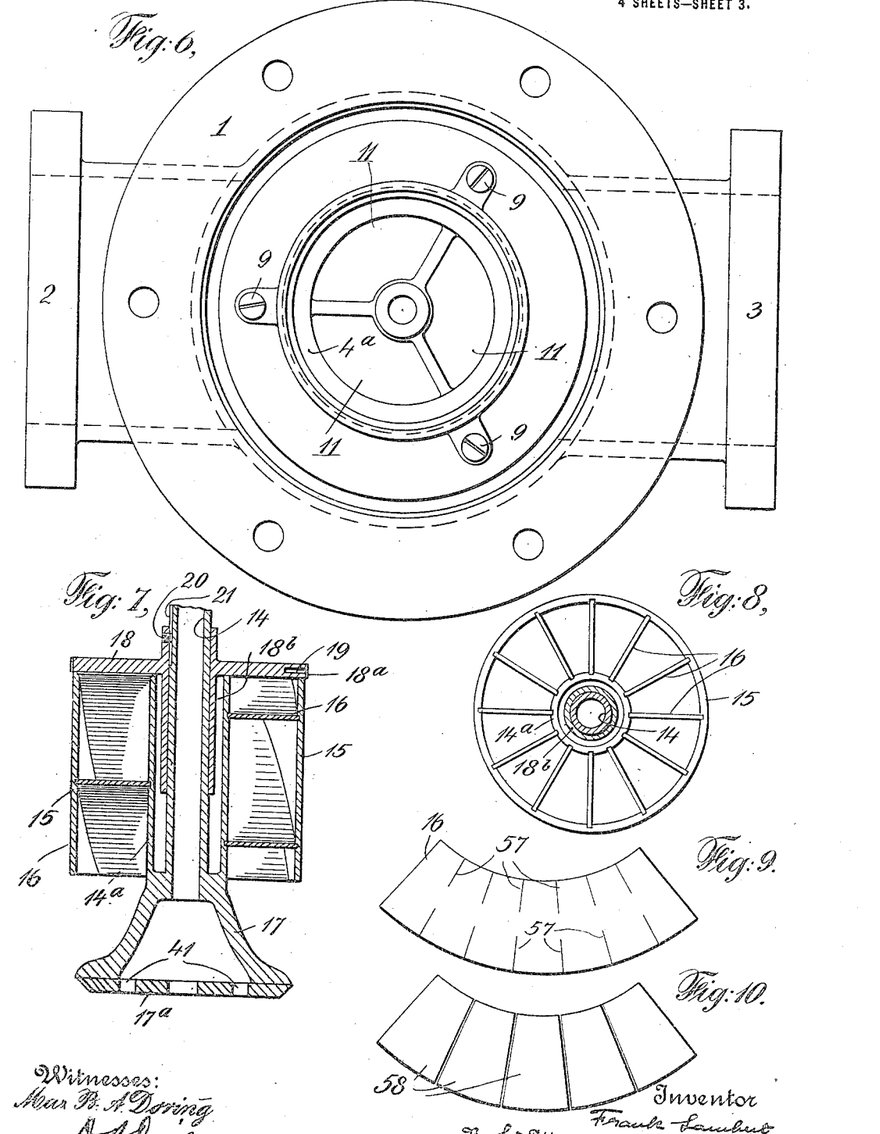
Fig. 6 shows a horizontal section of the meter casing, through the rotor chamber thereof, looking downward.
Fig. 7 shows a central vertical section of an alternative form of rotor.
Fig. 8 shows a horizontal section of such rotor.
Figs. 9 and 10 illustrate alternative constructions of the rotor vanes, Fig. 9 illustrating the formation of such vanes of strips which are slit laterally at intervals, to permit ready accommodation of such strips to helicoidal curvature, Fig. 10 illustrating the formation of such vanes from segmental pieces.

To facilitate construction of the rotor, and also to make the reaction of the fluid upon the rotor as nearly peripheral as possible, I sometimes use the rotor construction shown in Figs. 7 and 8, in which construction, surrounding the hollow hub 14, there is what may be termed a false hub 14$^a$, closed at the bottom; the vanes 16 being provided in the space between this false hub 14$^a$ and the shell 15. The diameter of the false hub 14$^a$ being much greater than that of the hub 14, the curvature of the inner edges of the vanes is much less abrupt than in the construction illustrated in Fig. 1. When this construction is employed, I customarily provide the obstructor disk 18 with a downwardly extended hub portion 18$^b$, thereby providing said obstructor disk with a long guide on the rotor hub.

In Figs. 9 and 10 I illustrate the construction of the vanes of the rotor 5. These vanes are preferably constructed of hard sheet metal, but when so constructed, if formed from plain strips, it is difficult to make them assume the proper helicoidal curve. This difficulty may be overcome, however, by providing the strip with slits 57, as indicated in Fig. 9. In some cases, however, I form the vanes of segmental pieces 58, as shown in Fig. 10. Such segments are readily slipped into place and, being short, take the proper shape. Vanes constructed in either of these ways may be touched up with a little solder, to avoid leakage. The resulting rotor forms a very rigid unit which is light and true.

It will be noted that in the meter described, the rotor, the gear train, and the spindle 46 driving the register mechanism, all have a common axis. This is a great advantage, as it greatly simplifies the accurate construction of the mechanism of the meter, and tends to insure that such mechanism shall run very easy.

What I claim is:—

1. A fluid meter comprising in combination a main casing having inlet and outlet connections and a pressure chamber, a structurally separate rotor chamber seated within said pressure chamber and spaced away from the sides thereof and having a base provided with one or more ports for the flow of fluid from such inlet connection into said rotor chamber, and a rotor mounted for rotation within said rotor chamber and also for axial movement therein, and arranged to be held in fluid suspension by the action of the flowing fluid upon it.

2. A fluid meter comprising in combination a main casing having inlet and outlet connections and a pressure chamber, a structurally separate rotor chamber comprising a sleeve seated within said pressure chamber and having a base provided with one or more ports for the flow of fluid from such inlet connection into said rotor chamber, such sleeve spaced away from the sides of said pressure chamber, and a rotor mounted for rotation within said sleeve and also for axial movement therein, and provided with means adapted to close such port or ports in one position of the rotor, and to hold said rotor in fluid suspension in the flowing fluid, by the action of such fluid upon it.

3. A fluid meter comprising in combination a main casing having inlet and outlet connections and a pressure chamber, a structurally separate rotor chamber comprising a sleeve seated within said pressure chamber and having a base provided with one or more ports for the flow of fluid from such inlet connection into said rotor chamber, such sleeve spaced away from the sides of said pressure chamber, and a rotor mounted for rotation within said sleeve and also for axial movement therein and provided with means adapted to close such port or ports when the rotor is at rest, and to hold said rotor in fluid suspension in the flowing fluid, by the action of such fluid upon it.

4. A fluid meter comprising in combination a main casing having inlet and outlet connections and a pressure chamber, a structurally separate rotor chamber comprising a sleeve seated in said pressure chamber, and provided with a base having one or more ports for the flow of fluid through it, such sleeve spaced away from the sides of said pressure chamber, a rotor spindle carried by said base, and a rotor within said rotor chamber and mounted for rotation on said spindle and also for axial motion thereon, said rotor provided with means adapted to close such port or ports in one position of the rotor, and to hold the rotor in fluid suspension in the flowing fluid, by the action of such fluid upon it.

5. A fluid meter comprising in combination a main casing having inlet and outlet connections and a pressure chamber, a structurally separate rotor chamber comprising a sleeve seated in said pressure chamber, and provided with a base having one or more ports for the flow of fluid through it, such sleeve spaced away from the sides of the said pressure chamber, a rotor spindle carried by said base, and a rotor within said rotor chamber and mounted for rotation on said spindle and also for axial motion thereon, said rotor provided with means adapted to close such port or ports when the rotor is at rest, and to hold the rotor in fluid suspension in the flowing fluid, by the action of such fluid upon it.

6. A fluid meter comprising in combination a main casing having inlet and outlet connections and a pressure chamber, a structurally separate rotor chamber seated in said pressure chamber, and provided with a base having one or more ports for the flow of fluid through it, a rotor spindle carried by said base, and a rotor within said rotor chamber and mounted for rotation on said spindle and also for axial motion thereon, said rotor provided with a disk below the rotor proper but connected therewith and adapted to close such port or ports in one position of the rotor and to hold the rotor in fluid suspension in the flowing fluid by the action of such fluid upon it.

7. A fluid meter comprising in combination a rotor chamber, a rotor located within said chamber and mounted to rotate and also to move axially, said rotor arranged to be held in suspension in the fluid, by the action of the fluid and against the action of an opposing force, said rotor provided with a worm screw, mechanism arranged to be driven by said rotor comprising a worm wheel in engagement with said worm screw, said screw being of a length adequate to permit continued engagement of the worm screw and worm wheel, notwithstanding axial motion of the rotor.

8. A fluid meter comprising in combination a rotor chamber, a rotor therein, and a valve provided on a downwardly-extending foot of said rotor and arranged to close said rotor chamber against the admission of fluid, when the flow of fluid to be metered stops, and to open such chamber for fluid admission when the flow of such fluid begins.

9. A fluid meter comprising in combination a rotor chamber, a rotor therein and a gravity-operated valve provided on a downwardly-extending foot of said rotor and arranged to close said rotor chamber against the admission of fluid, when the flow of fluid to be metered stops, and to open such chamber for fluid admission when the flow of such fluid begins.

10. A fluid meter comprising in combination a casing having a rotor chamber and a rotor therein arranged to be immersed in the fluid to be metered when in action, and having a weight greater than that of the fluid which it displaces, said rotor provided with a downwardly-extending foot itself provided with a disk, in the path of the flowing fluid, and arranged to hold said rotor when in action, in fluid suspension in the flowing fluid, said disk arranged to engage a fixed member of the meter structure and arrest rotation of the rotor when the rotor descends under the influence of gravity upon cessation of flow.

11. A fluid meter comprising in combination a casing, a rotor spindle therein, and a rotor mounted to rotate on said spindle, and to move axially thereon and comprising a hollow hub fitting over said spindle and closed at one end, and provided with a port permitting flow of fluids to and from the space between the end of said spindle and the end of the bore of the hub.

12. A fluid meter comprising a rotor provided with a plurality of passages for the flow of the fluid to be metered and with automatic obstructing means for one or more of said passages comprising an axially-movable obstructor arranged to be moved in one direction by the action of the fluid and in the opposite direction by an opposing force.

13. A fluid meter comprising a rotor provided with a plurality of passages for the flow of fluid to be metered, and with automatic obstructing means for one or more of said passages comprising a member arranged to be moved in one direction by the action of the fluid, and in the opposite direction by an opposing force, and provided with one or more escape-orifices in communication with one or more of said passages.

14. A fluid meter comprising a rotor provided with a plurality of passages for the flow of fluid to be metered, and with automatic obstructing means comprising a member arranged to be moved in one direction by the action of the fluid, and in the opposite direction by an opposite force, and provided with one or more escape-orifices in communication with one or more of said passages, such orifice or orifices directed rearwardly with respect to the normal direction of rotation of the rotor, whereby reaction of the fluid escaping from such orifice or orifices tends to start the rotor in rotation.

15. A fluid meter comprising a rotor provided with a plurality of passages for the flow of fluid to be metered, and with automatic obstructing means comprising a disk covering said passages when the rotor is at rest and arranged to move axially away from said rotor under the influence of fluid flowing through the rotor, said disk provided with one or more orifices communicating with one or more of said passages of the rotor, and directed rearwardly with reference to the direction of normal rotation of the rotor, whereby reaction of the fluid escaping from such orifice or orifices tends to start the rotor in rotation.

16. A fluid meter comprising a rotor provided with a plurality of passages for the flow of fluid to be metered, and with automatic obstructing means comprising a disk covering said passages when the rotor is at rest and arranged to move axially away from said rotor under the influence of fluid flowing through the rotor, said disk provided with one or more slots extending from the periphery of said disk inward and forming orifices for the flow of fluid from one or more of the passages of said rotor, said slots directed rearwardly with reference to the normal direction of rotation of the rotor, and a ring fitting over the periphery of said disk.

17. A fluid meter comprising a rotor provided with a plurality of passages for the flow of fluid to be metered, and with automatic obstructing means comprising an obstructor disk mounted upon the hub of the rotor and arranged to move axially thereon away from the rotor, said rotor and disk provided with means for preventing rotation of said disk with reference to said rotor.

18. A fluid meter comprising in combination a rotor chamber, provided with a spindle having a thrust-bearing shoulder, a rotor and a brake therefor freely mounted on said spindle, both adapted to rotate and move axially thereon, said brake being adapted at large flow to engage said shoulder to limit the axial motion of the brake.

19. A fluid meter comprising in combination a pressure casing, and a rotor and a brake plate therefor within said casing, said rotor and said brake plate being adapted to rotate and also to move axially in said casing, one of said members being provided with means for admitting fluid under pressure between said rotor and said brake plate.

20. A fluid meter comprising in combination a rotor chamber, provided with inlet and outlet passages, a rotor within said chamber and mounted to rotate and also to move axially, said rotor provided with a bevel-edged valve arranged to engage a corresponding seat adjacent the connection of said inlet passage to said rotor chamber, to shut off admission of fluid to the rotor chamber, said valve arranged to move from its seat and thereby move the rotor axially, against an opposing force, upon the commencement of material flow.

21. A fluid meter comprising in combination a pressure casing, a main rotor therein, and a secondary rotor and mechanism arranged to be driven both by the main rotor and by said secondary rotor, said secondary rotor arranged to drive such mechanism at rates of flow too low for correct drive of said mechanism by the main rotor.

22. A fluid meter comprising in combination a pressure casing, a main rotor therein, and a secondary rotor and mechanism arranged to be driven both by the main rotor and by said secondary rotor, said secondary rotor provided with one or more nozzle orifices arranged to project the fluid metered in a direction to cause rotation of the secondary rotor in the direction of normal rotation of the main rotor.

23. A fluid meter comprising in combination a pressure casing, a main rotor therein having flow passages, a secondary rotor, and mechanism arranged to be driven by said main rotor and secondary rotor, said secondary rotor having one or more nozzle orifices arranged to project the fluid metered in a direction to cause rotation of the secondary rotor in the direction of normal rotation of the main rotor, said secondary rotor arranged to close the flow passages of the main rotor at low flows except for the escape permitted by said nozzle orifices, and arranged to open the flow passages of the main rotor at larger flows.

24. A fluid meter comprising in combination a pressure casing, a rotor therein and a speeder for said rotor, both having ports slanting in the same direction.

25. A fluid meter comprising in combination a pressure casing, a rotor therein and a speeder for said rotor, both having ports slanting in the same direction and of different delivering capacity, the area of delivering capacity of the ports in the rotor being greater than those in the speeder.

26. A fluid meter comprising in combination a main casing, a rotor therein and a speeder for said rotor, both said rotor and said speeder being mounted on a common axis and adapted to rotate at the same speed and to move axially a variable amount.

27. A fluid meter comprising in combination a main casing, a rotor therein and a speeder for said rotor, both the rotor and the speeder being adapted to rotate and move axially, the axial movement of the speeder being greater than that of the rotor.

28. A fluid meter comprising in combination a main casing, and two rotors in said casing, one of said rotors being adapted to actuate a registering mechanism at large flows, and the other rotor to actuate it at small flows.

29. A fluid meter comprising in combination a pressure casing, a rotor therein and a speeder therefor, said rotor being adapted to drive the speeder at large flows and to be driven by the speeder at low flows.

30. A fluid meter comprising in combination a pressure casing, two rotors therein, one of said rotors being adapted to drive the other rotor at large flows and to be driven by it at small flows.

31. A fluid meter comprising in combination a pressure casing, a rotor therein and a speeder, both arranged to rotate and have an axial motion of variable extent, said rotor being adapted to be held in suspension while the fluid is in motion and to come to a sudden stop when the flow ceases.

32. A fluid meter comprising in combination a main casing, a rotor therein mounted for rotation and having a plurality of slanting passages for the fluid, a speeder for said rotor having also one or more slanting passages for the fluid, the said passages for the flow in the rotor and the speeder slanting in the same direction, but being of different area.

In testimony whereof I have signed this specification in the presence of two subscribing witnesses.

FRANK LAMBERT.

Witnesses:
H. M. MARBLE,
D. A. DAVIES.

Copies of this patent may be obtained for five cents each, by addressing the "Commissioner of Patents, Washington, D. C."